United States Patent [19]

Goergen et al.

[11] Patent Number: 4,462,446

[45] Date of Patent: Jul. 31, 1984

[54] PNEUMATIC TIRE TREAD

[75] Inventors: René Goergen, Colmar-Berg, Luxembourg; Jacob Kleywegt, Arlon, Belgium

[73] Assignee: The Goodyear Tire & Rubber Company, Akron, Ohio

[21] Appl. No.: 371,106

[22] Filed: Apr. 23, 1982

[51] Int. Cl.³ .............................................. B60C 11/06
[52] U.S. Cl. ................................ 152/209 R; D12/145
[58] Field of Search .................. 152/209 R; D12/141, D12/142, 143, 140, 152, 145

[56] References Cited

U.S. PATENT DOCUMENTS

| 2,322,505 | 6/1943 | Bull | 152/209 R |
|---|---|---|---|
| 2,459,762 | 1/1949 | Hargraves | 152/209 R |
| 3,559,711 | 2/1971 | Sehelkmann | 152/209 R |
| 3,674,076 | 7/1972 | Dailey, Jr. | 152/209 R |
| 3,831,654 | 8/1974 | Boileau | 152/209 R |
| 3,841,374 | 10/1974 | Boileau | 152/209 R |
| 3,847,698 | 11/1974 | Ravenhall | 152/209 R |
| 4,177,850 | 12/1979 | Ogawa et al. | 152/209 R |

FOREIGN PATENT DOCUMENTS 1680426  9/1971  Fed. Rep. of Germany .

Primary Examiner—Michael W. Ball
Attorney, Agent, or Firm—Frank Pincelli

[57] ABSTRACT

A tread for a pneumatic tire comprising a plurality of circumferentially extending grooves, the grooves comprising alternating wide and narrow portions. The grooves are disposed such that the net contact area in the footprint of the tire during rotation is substantially constant and the net contact area in the footprint of the tire being at least seventy percent (70%).

4 Claims, 12 Drawing Figures

PNEUMATIC TIRE TREAD

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to pneumatic tires and more particularly to a tire tread for trucks and similar vehicles. It is well known in the tire industry that the choice of a particular tread design involves trade-offs between specific tire performance characteristics. Among such characteristics are those directed to mileage, wet traction, dry traction, snow traction and handling. A tread design which has good wet traction or snow traction is generally obtained at the expense of mileage, dry traction, and/or handling. Accordingly, prior art tread patterns which have good mileage characteristics are obtained at the sacrifice of wet skid and wet traction characteristics.

Applicants have discovered a particular tread arrangement whereby improved mileage performance of the tire can be obtained without any substantial loss of wet skid, and wet and snow traction.

DETAILED DESCRIPTION OF THE INVENTION

Figure 1:
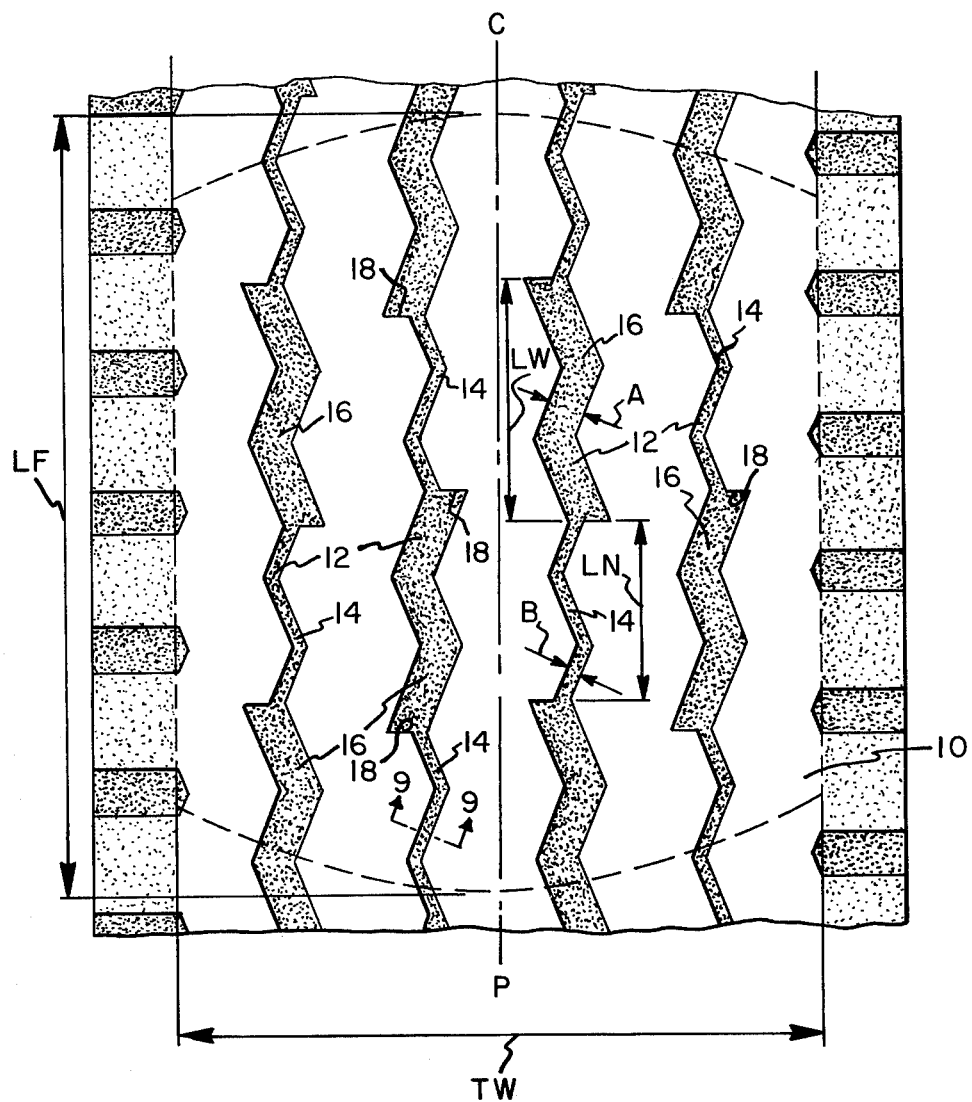
FIG. 1 is a fragmentary plan view of the tread of a tire made in accordance with the present invention.

Referring to FIG. 1, there is illustrated a plan view of a portion of a tread for a pneumatic tire for use on a truck or similar vehicle, preferably the tire being of a radial type construction. For the purposes of this invention, a radial type construction is a tire wherein the cords of the carcass reinforcing structure are oriented at an angle from about 75° to 90° with respect to the mid-circumferential centerplane of the tire. Also, for the purposes of this invention, a truck tire shall be considered a tire having a rim diameter of approximately 15 inches or greater. The tread 10 is provided with a plurality of grooves 12 which extend about the circumference of the tire. The grooves 12 have a width such that they do not close up at the tread surface when in the footprint of the tire. In the particular embodiment illustrated, the grooves 12 follow a substantially zig-zag path about the circumference of the tire. The grooves 12 each are comprised of circumferentially alternating narrow portion 14 and wide portions 16 of substantially constant width. The narrow portions 14 each have a circumferential length LN and a cross-sectional width B and the wide portions 16 each have circumferential length LW and a cross-sectional width A. The length LW of wide portion 16 and length LN of narrow portion 14 may each vary between 0.1 and 3.0 times the length LF of the footprint of the tire, preferably between 0.2 and 1.0 times the length LF of the footprint of the tire. The dash line of FIG. 1 is an example of an outline of a typical footprint of a pneumatic truck tire. The maximum tread width TW being the maximum axial width of the tread measured perpendicular to the mid-circumferential centerplane CP as taken from the footprint of the tire inflated to recommended pressure and at rated load. For the purposes of this invention, the footprint length LF is the maximum length of the footprint measured parallel to the mid-circumferential centerplane CP of the tire as taken from the footprint of the tire inflated to rated pressure and at rated load. In the particular embodiment illustrated, the length LW of wide portion 16 and length LN of narrow portion 14 are substantially identical and are each approximately 30% of the footprint length LF however, they need not be the same and preferably do not vary by more than 100%.

The width B of the narrow portions 14 is such that it does not close up at the surface when in the footprint of the tire. The ratio between the width B of narrow portion 14 to the width A of wide portion 16 is in the range from about 10% to 60%, preferably in the range of 20% to 40% as measured from the tire mounted on a rim for which the tire is designed to be used and inflated to recommended inflation pressure. In the particular embodiment illustrated, the width B is approximately one-third of the width A of wide portions 16. In the particular embodiment illustrated, the width of wide portion 16 and narrow portion 14 of adjacent grooves 12 are substantially the same, however, wide portion 16 and narrow portion 14 of adjacent grooves 12 may be different.

Figure 2:
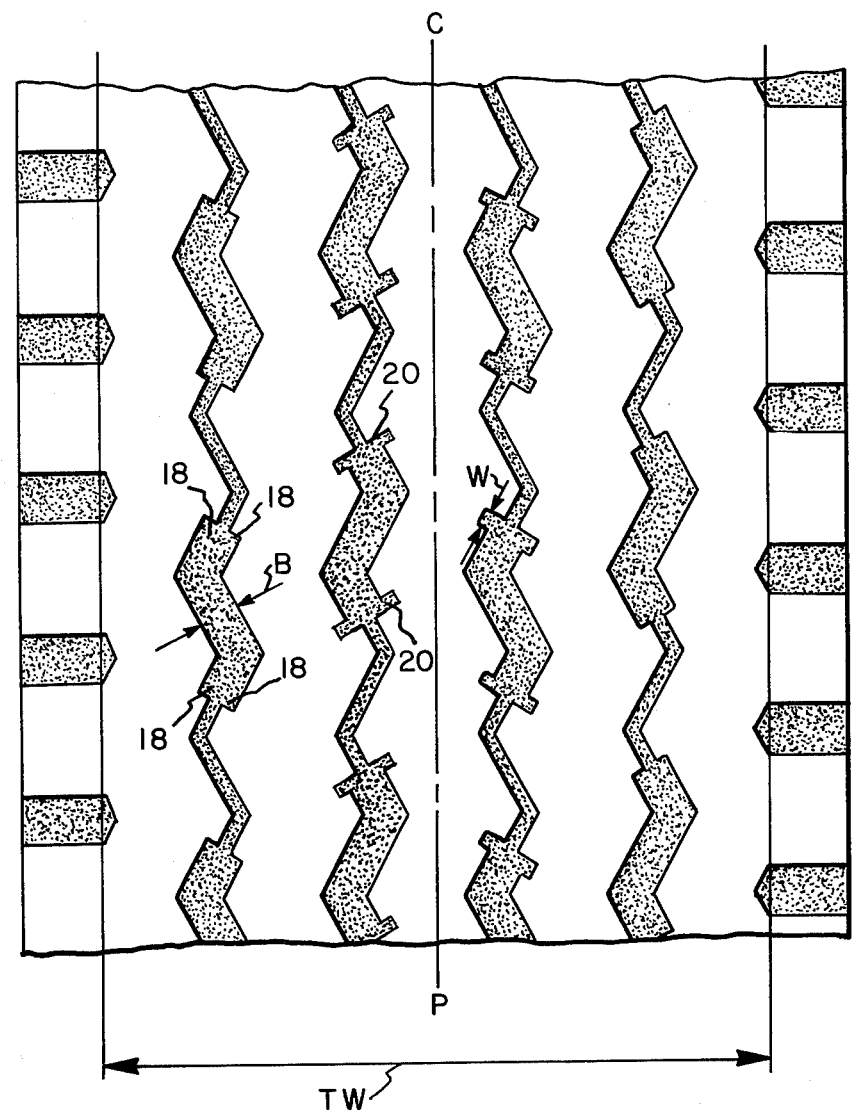
FIGS. 2–7 are fragmentary plan views of modified treads for a pneumatic tire made in accordance with the present invention.
Figure 3:
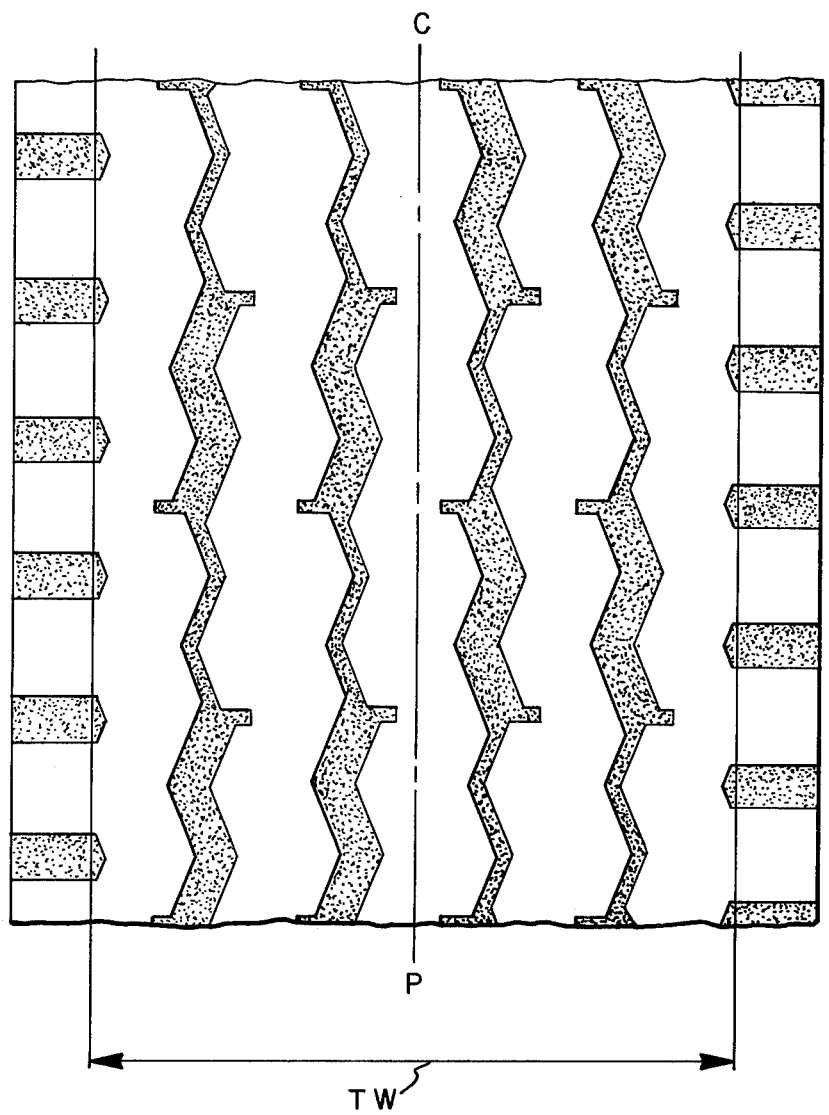

In the particular embodiment illustrated in FIG. 1, there is provided four circumferentially extending zig-zag grooves 12. The grooves 12 are disposed so that the net contact area of the tread in the footprint remains substantially constant during rotation of the tire, generally no greater than a 25% variation and preferably less than a 10% variation during rotation of the tire. As can be seen this is accomplished by staggering wide portions 16 of adjacent circumferential grooves 12. FIG. 1 illustrates that as you proceed axially across the tread adjacent circumferential grooves 12 alternate in having wide portions 16 and narrow portions 14. However, the present invention is not limited to such, wide portions 16 and narrow portions 14 may be staggered in any manner desired such as illustrated in FIGS. 2 and 3 wherein the wide portions of circumferentially adjacent grooves 12 are staggered by only a portion of its length.

The particular width B of the narrow portions 14 of groove 12 and the width A of wide portions 16 of the grooves 12 is such that the net to gross, that is, the ratio of the net contact area in the footprint to the total available area in the footprint, is at least 70% and preferably at least 75%. In the particular embodiment illustrated, the net to gross ratio is approximately 80%.

At the juncture where the wide portions 16 meet the narrow portions 14, there is provided axially extending traction surfaces 18 which help provide improved traction performance of the tire. Traction surfaces 18 may be provided on one side of the narrow portions as illustrated in FIG. 1 or on both sides as illustrated in FIG. 2. Traction surfaces 18 form an angle of at least 45° with the mid-circumferential centerplane and preferably of at least 80°. In the particular embodiment illustrated in FIG. 3, traction surfaces 18 form an angle of approximately 90°.

Applicants have discovered that by providing a tread pattern with circumferentially extending grooves having alternating wide and narrow portions while maintaining substantially constant net to gross contact area in the footprint which is at least 70% maximizes the amount of contact area of the tread which engages the road surface while also providing sufficient amount of void area to evacuate any water or fluid that may be present. Generally, the more contact area in the footprint, the greater the mileage will be obtained. However, wet or snow traction performance of the tire is sacrificed.

Applicants have found that when a tire has grooves with alternating wide and narrow portions as taught by applicants, the mileage of the tire can by significantly improved without any substantial reduction in wet traction, snow traction, or wet skid of the tire.

Figure 7:
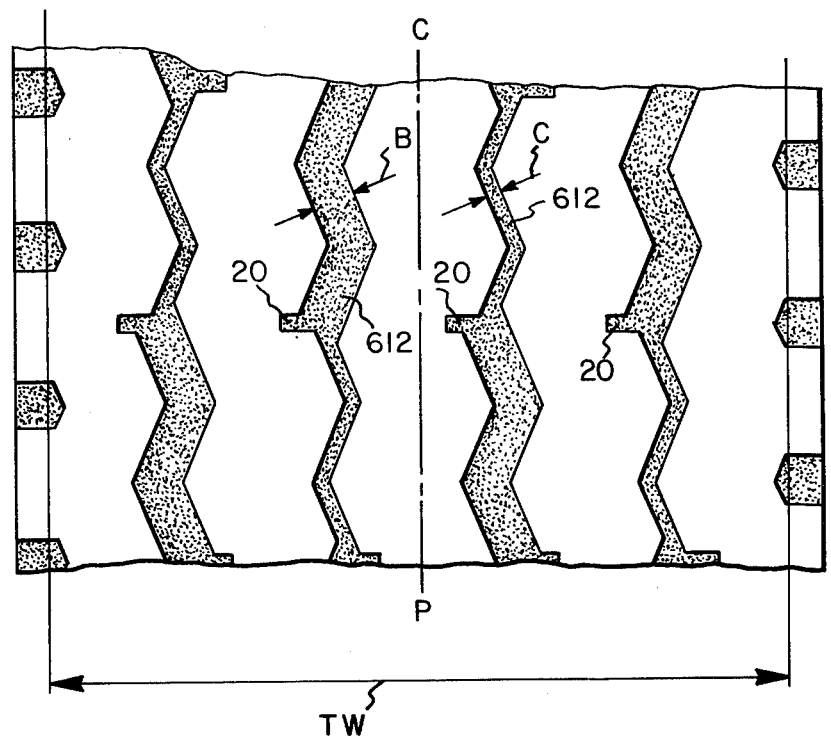
Figure 8:
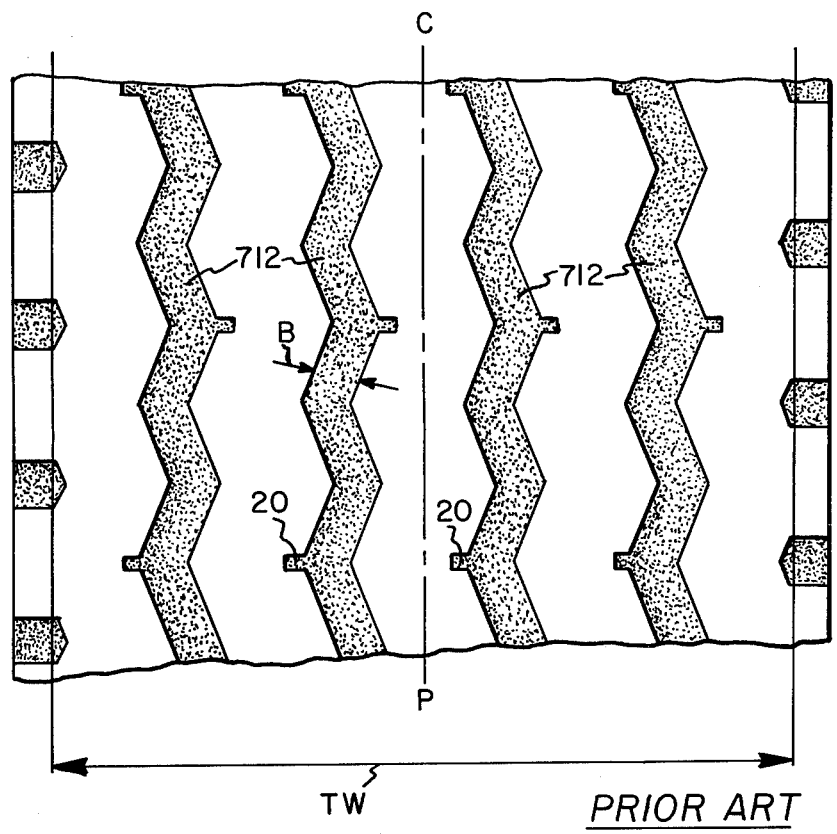
FIG. 8 is a fragmentary plan view of the tread of a tire not made in accordance with the present invention.

In a recent test of a truck tire made in accordance with the present invention, it was found that approximately a 5% improvement in mileage could be obtained. FIG. 7 illustrates a tire made in accordance with the present invention wherein FIG. 8 illustrates a tire having a tread not made in accordance with the present invention. The two tires were identical except that the tire of FIG. 8 had substantially wide grooves wherein the tire made in accordance with the present invention had alternating wide and narrow portions. Additionally, a notched portion 20 was provided at the juncture between the wide and narrow portion in the present invention and notched portions were provided at every third peak in the zig-zag pattern of a tire made in accordance with the prior art. The tire size was 12.00 R20 (FR20); 12.00 representing the section diameter of the tire as measured in inches and 20 being the rim diameter as measured in inches. The cross-sectional width B of the grooves 712 of FIG. 8 is approximately 14 mm. The width B of the wide portions of the grooves 612 of FIG. 7 were also 14 mm. The narrow portion of the grooves had a width C equal to about one-third of the width of the wide portions, that is 4.5 mm. All other features of the tire were identical. The tires were both provided with shoulder notches as illustrated. Due to the alternating wide and narrow portions of applicant's tire, there was an 8% increase in net to gross in the footprint of the tire. After approximately 155,000 kilometers of highway testing on the front axle of the truck, the tire of FIG. 7 showed a 5% increase in mileage over the tire of FIG. 8.

Wet, skid and dry traction performance, may be further enhanced by providing notched portions 20 as illustrated in FIGS. 2, 3, 4, 5 or 6. The axial width w of notch portion 20 should be no greater than 35% of the width B of wide portion 16. For the purposes of this invention, the width w of notch portion 20 is the width of the notch measured perpendicular to the surface 18 of the grooves from which it extends.

Figure 4:
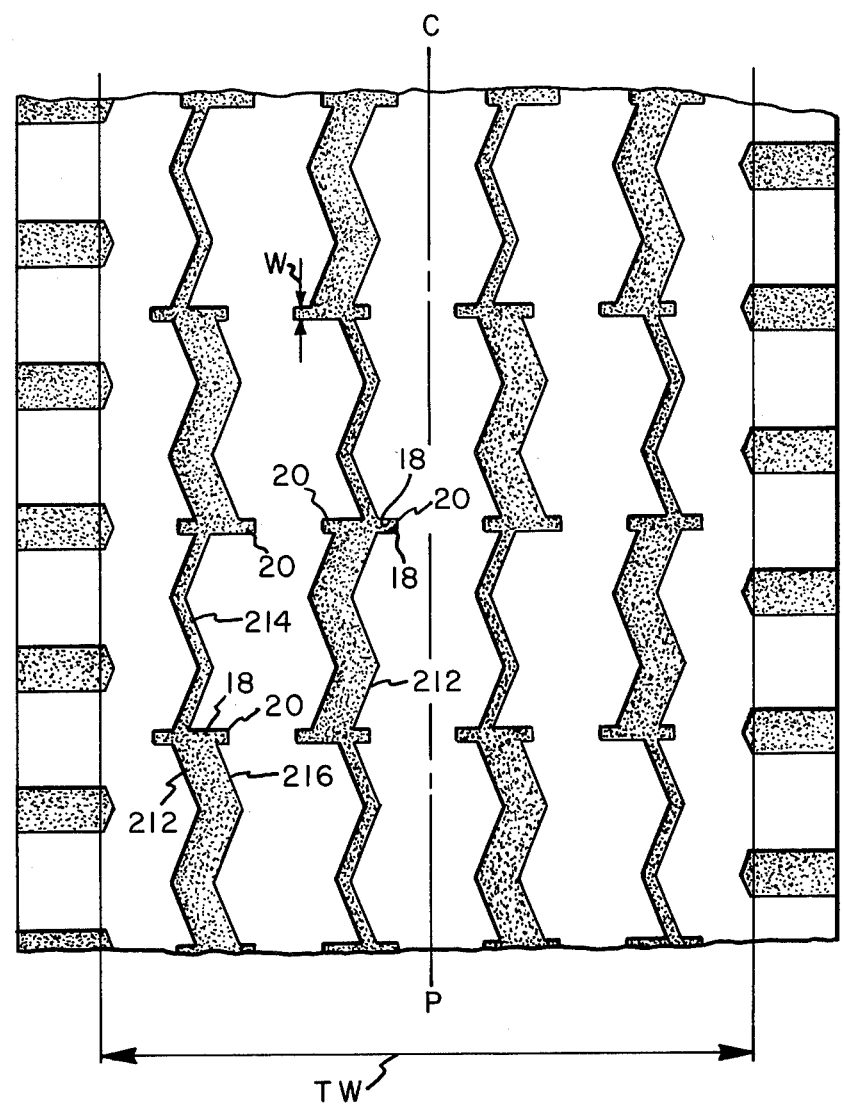

Referring to FIG. 4 there is illustrated a tread pattern having notches 20 on both axial sides of the groove 212 at the point where narrow portions 214 and wide portions 216 merge.

Figure 5:
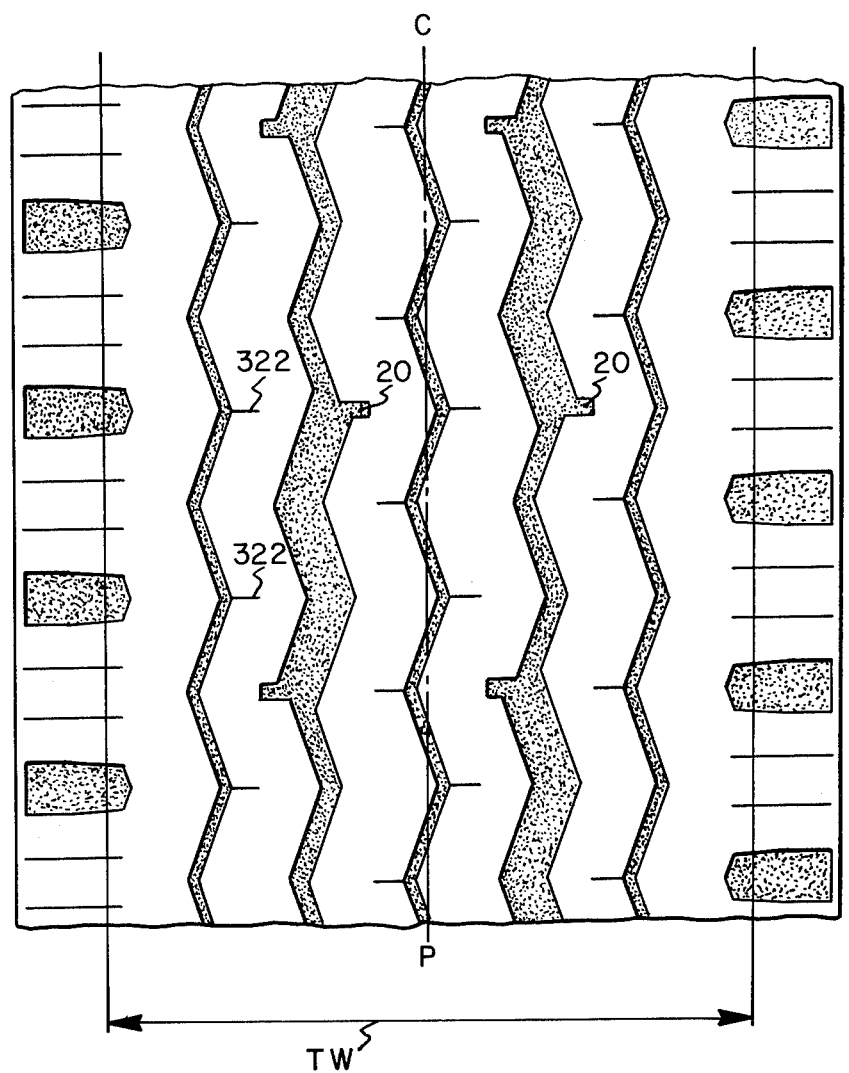

Referring to FIG. 5, there is illustrated a modified form of the present invention wherein narrow blades 322 may be added to the tread pattern if so desired. For the purposes of this invention, a blade shall be considered a narrow groove which will close at the contact surface when in the footprint of the tire.

Figure 6:
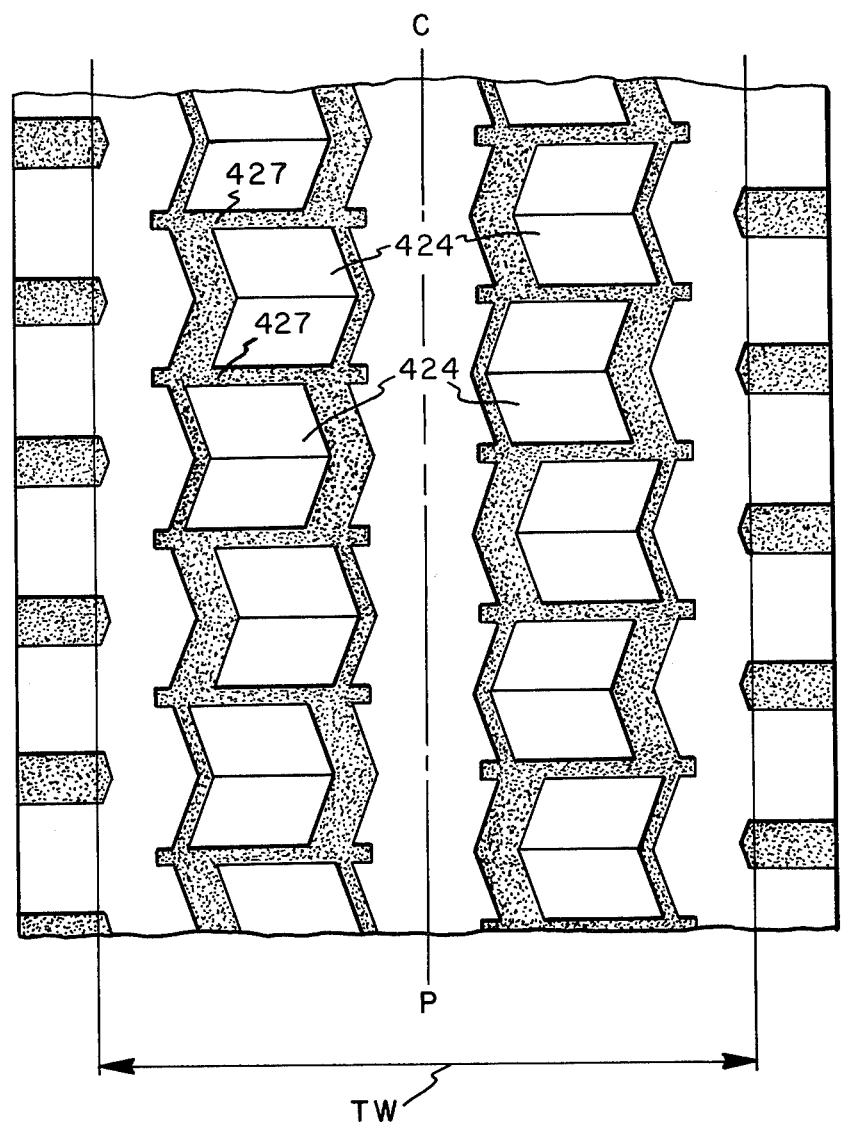

The tread pattern formed may comprise continuous circumferentially extending ribs and rows of independent projections 424 as illustrated in FIG. 6. The projection 424 in each row being separated by a generally axially extending water channeling groove 427. If desired, the tread may be comprised solely of independent projections.

Figure 9:
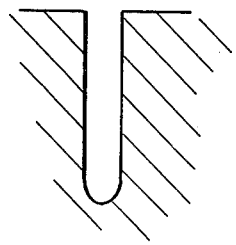
FIG. 9 is a fragmentary cross-sectional view of the tread of FIG. 1 taken alone lines 9—9.
Figure 10:
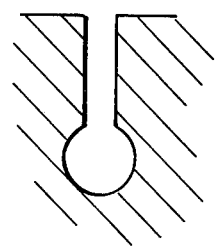
FIGS 10–12 are fragmentary cross-sectional views similar to that of FIG. 9 illustrating modified cross-sectional groove shapes.
Figure 11:
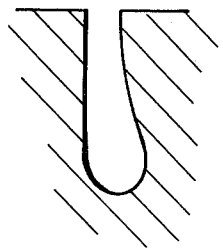
Figure 12:
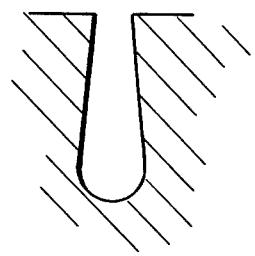

FIG. 9 illustrates a cross-sectional view of narrow portion 14 taken along lines 9—9 of FIG. 1. Applicants have found that further improvement such as better water dispersal may be made by increasing the cross-sectional width of the narrow portions 14 of groove 12 at a point below the tread surface as is illustrated in FIGS. 10-12.

While certain representative embodiments and details have been shown for the purposes of illustrating the invention, it will be apparent to those skilled in the art that various changes and modifications may be made therein without departing from the spirit or scope of the present invention.

We claim:

1. A pneumatic truck tire having a ground-engaging tread portion characterized by said tread portion having a plurality of circumferentially continuous grooves, said grooves comprising alternating circumferentially extending wide and narrow portions of substatially constant width said narrow portions having a width such that the narrow portions do not close up at the surface of the tread when in the footprint of the tire, each of said wide and narrow portions having a circumferential length in the range of 20% to 100% of the length of the footprint of said tire, said narrow portions of said grooves having a width in the range of 20% to 40% of the width of said wide portions of said grooves, said narrow portions and wide portions of adjacent grooves being staggered in a circumferential direction so that the net contact of the area of said tread in said footprint is substantially constant during rotation of the tire and does not vary by more than approximately 10% during rotation, said tread portion having a net contact area in the footprint of the tire of at least 75%, at the juncture of said narrow portion and said wide portion there is provided an axially extending traction surface, said traction surface being oriented at an angle of at least 80° with respect to the mid-circumferential centerplane of the tire.

2. A pneumatic truck tire according to claim 1 further characterized in that said plurality of circumferentially continuous grooves comprises four.

3. A pneumatic truck tire according to claim 1 further characterized in that at the juncture between said wide portions and narrow portions there is also provided a notched section which has a axial width no greater than about 35% of the width of said wide portions.

4. A pneumatic truck tire according to claim 1 further characterized in that said tire is of the radial type construction.

* * * * *

UNITED STATES PATENT AND TRADEMARK OFFICE
CERTIFICATE OF CORRECTION

PATENT NO. : 4,462,446
DATED : July 31, 1984
INVENTOR(S) : Rene' Goergen, et al

It is certified that error appears in the above-identified patent and that said Letters Patent are hereby corrected as shown below:

Column 1, line 39, "alone" should be --along--;
Column 1, line 64, "portion" should be --portions--;
Column 4, line 32, "substatially" should be --substantially--.

Signed and Sealed this

Nineteenth Day of March 1985

[SEAL]

Attest:

DONALD J. QUIGG

*Attesting Officer*   *Acting Commissioner of Patents and Trademarks*